A. D'ERCOLE.
PROCESS OF GRANULATING COMMERCIAL CALCIUM CYANAMID POWDER.
APPLICATION FILED NOV. 12, 1908.
973,019. Patented Oct. 18, 1910.
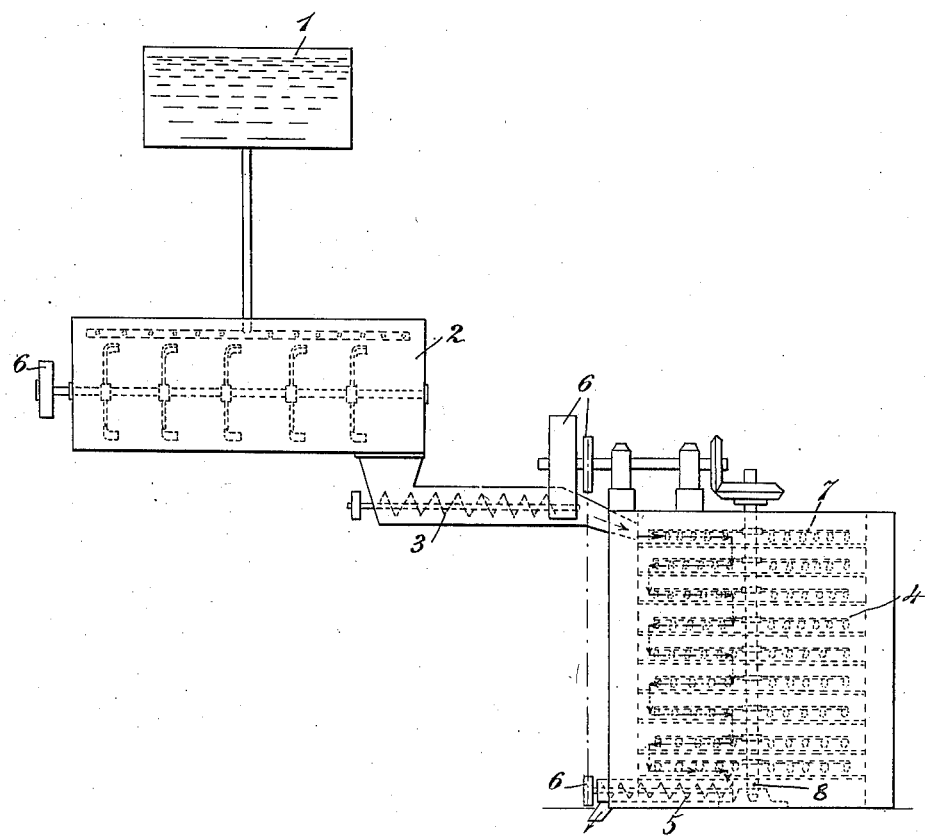

UNITED STATES PATENT OFFICE.

ANASSAGORA D'ERCOLE, OF ROME, ITALY.

PROCESS OF GRANULATING COMMERCIAL CALCIUM-CYANAMID POWDER.

973,019. Specification of Letters Patent. Patented Oct. 18, 1910.

Application filed November 12, 1908. Serial No. 462,220.

*To all whom it may concern:*

Be it known that I, ANASSAGORA D'ERCOLE, a subject of the King of Italy, resident of 32 Via Paolo Emilio, Rome, Italy, professor of chemistry, have invented a certain new and useful Process of Granulating Commercial Calcium-Cyanamid Powder, of which the following is a specification.

The use of commercial calcium cyanamid in a powdered state as a fertilizer has various drawbacks, owing to its pulverulent condition and its contents of unslaked lime and calcium carbid. The fine powder is harmful both to the eyes and lungs and, besides, it is difficult to pack it in sacks, and when strewn in the fields, it is partly dispersed by the wind. The sacks containing the powder often burst on account of the increase in the weight and volume of the powder caused by the hydration of the caustic lime due to atmospheric humidity. Finally, powdered calcium-cyanamid which commonly contains calcium phosphid, carbid and calcium oxid when in the ground causes development of acetylene which is obnoxious to the plants. All these disadvantages are obviated by the use of granulated calcium cyanamid.

My present invention has for its object to provide a process of granulating commercial calcium cyanamid powder and the new commercial product thereby obtained.

My new process substantially comprises the uniform wetting of calcium cyanamid powder with a material capable of reducing it from a powdered to a granular condition, after which it is rapidly spread out in a very thin layer, and then dried. The wetting may be done with water in a proportion not less than 25% and not more than 35% or a watery solution of mineral salts, or a watery solution of adhesive materials, either alone or in combination. As mineral salts, those of sodium, magnesium, manganese, zinc, iron, aluminum and calcium are preferred, which are used in proportion of 5%, and as adhesive liquids 1%–2% solutions of gum, glue, gelatin, starch, albuminous materials, casein, caseinates, albuminates, etc., are used. The adhesive powder may be increased by the addition of an aluminum salt such as alum, sodium aluminate, aluminum sulfate, etc.

The purpose of rapidly spreading out the moistened calcium cyanamid powder in very thin layers is to lower the rapidly rising temperature of the product due to the action of water on the unslaked lime contained therein. The heat otherwise generated would prevent granulation, and, moreover, a loss of nitrogen by the decomposition of the calcium cyanamid would be caused.

For carrying out my process, I use an apparatus as shown on the annexed drawing, in which—

1 is the water-distributing tank, 2 a kneading apparatus, 3 a conveyer screw, 4 the drier, 5 a screw for discharging the dried material, 6 the driving pulleys and 7 an agitating device operated by the vertical shaft 8.

The operation of the apparatus is as follows: The calcium cyanamid powder is introduced into the kneading apparatus 2, where it is moistened with a sufficient quantity of water. From the kneading apparatus calcium cyanamid is transferred by the conveyer screw 3 into the drying apparatus 4, where it passes onto the agitating device 7, which consists in this case of nine rotating circular disks provided with openings, through which the material gradually reaches the screw 5, whereby it is discharged. During its passage through the drying apparatus, the calcium cyanamid is dried and continuously agitated, so that it will not agglomerate. When the cyanamid reaches the discharging screw 5, it is completely dried and ready to be filled into boxes or the like.

I claim:

A process of granulating commercial calcium cyanamid powder consisting in first uniformly wetting the powder with water in a proportion not less than 25% and not more than 35%, thereby causing the particles to adhere and then repeatedly spreading out said particles into very thin layers and drying and granulating the same.

In testimony whereof I have affixed my signature in presence of two witnesses.

ANASSAGORA D'ERCOLE.

Witnesses:
BARTOLUZZI TOMMASSO,
G. LENZI.